(12) United States Patent
Ouyang et al.

(10) Patent No.: US 10,044,979 B2
(45) Date of Patent: *Aug. 7, 2018

(54) ACQUIRING REGIONS OF REMOTE SHARED CONTENT WITH HIGH RESOLUTION

(71) Applicant: Cisco Technology, Inc., San Jose, CA (US)

(72) Inventors: Hua Ouyang, Jiangsu (CN); Qi Shi, Jiangsu (CN); Huahua Yin, Jiangsu (CN); Yi Lu, Jiangsu (CN); Yunwei Luo, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 809 days.

This patent is subject to a terminal disclaimer.

(21) Appl. No.: 13/969,757

(22) Filed: Aug. 19, 2013

(65) Prior Publication Data

US 2015/0052200 A1  Feb. 19, 2015

(51) Int. Cl.
| | | |
|---|---|---|
| G06F 15/16 | (2006.01) | |
| H04N 7/15 | (2006.01) | |
| H04L 12/18 | (2006.01) | |
| H04L 29/06 | (2006.01) | |
| H04M 3/56 | (2006.01) | |

(52) U.S. Cl.
CPC ........... *H04N 7/15* (2013.01); *H04L 12/1813* (2013.01); *H04L 12/1827* (2013.01); *H04L 65/4007* (2013.01); *H04M 3/567* (2013.01)

(58) Field of Classification Search
CPC ..................... H04L 29/08072; H04L 29/08

USPC .................. 709/206, 220; 345/420, 629
See application file for complete search history.

(56) References Cited

U.S. PATENT DOCUMENTS

| | | | |
|---|---|---|---|
| 6,924,822 B2 | 8/2005 | Card et al. | |
| 7,698,660 B2* | 4/2010 | Sanchez | G06F 9/4443 715/753 |
| 8,004,540 B1* | 8/2011 | Munter | G06F 3/1438 345/2.2 |
| 8,185,828 B2 | 5/2012 | Liu et al. | |
| 8,503,996 B1* | 8/2013 | Fujisaki | H04M 1/56 455/414.2 |

(Continued)

OTHER PUBLICATIONS

Freedom Scientific, Inc., MAGic® Quick Start Gunde, retrieved from http://www.freedomscientific.com/products/low-vision/MAGic-screen-magnification-software.asp, on Aug. 19, 2013, 38 pages.

(Continued)

*Primary Examiner* — Khanh Dinh
(74) *Attorney, Agent, or Firm* — Edell, Shapiro & Finnan, LLC

(57) ABSTRACT

Presented herein are techniques to enable a meeting participant/attendee at a first endpoint device in an online/web-based meeting/conference to acquire shared content with high resolution. The first endpoint device receives an initial image of content shared by a second endpoint in the online/web-based meeting/conference. At the first endpoint, the initial image of the shared content is displayed. A user selection of a selected region of the initial image is received at the first endpoint, and a second image of the shared content corresponding to the selected region is received at the first endpoint, wherein the second image has a higher resolution than the initial image.

20 Claims, 13 Drawing Sheets

(56) References Cited

U.S. PATENT DOCUMENTS

| | | | | |
|---|---|---|---|---|
| 8,825,812 B2* | 9/2014 | Asher | | H04L 65/60 |
| | | | | 709/203 |
| 9,071,615 B2* | 6/2015 | Sanchez | | G06F 9/4443 |
| 9,154,737 B2* | 10/2015 | Thomas | | H04L 65/403 |
| 9,179,116 B1* | 11/2015 | Liao | | G11B 27/28 |
| 9,471,269 B2* | 10/2016 | Dunn | | G09B 5/067 |
| 9,516,267 B2* | 12/2016 | Wang | | H04N 7/142 |
| 2004/0008423 A1* | 1/2004 | Driscoll, Jr. | | G02B 13/06 |
| | | | | 359/725 |
| 2006/0159325 A1* | 7/2006 | Zeineh | | G06F 19/3443 |
| | | | | 382/128 |
| 2007/0279483 A1* | 12/2007 | Beers | | H04L 29/06027 |
| | | | | 348/14.08 |
| 2008/0114844 A1* | 5/2008 | Sanchez | | G06F 9/4443 |
| | | | | 709/206 |
| 2010/0030578 A1* | 2/2010 | Siddique | | G06Q 10/0637 |
| | | | | 705/3 |
| 2014/0006976 A1* | 1/2014 | Hutchinson | | G09B 5/067 |
| | | | | 715/753 |

OTHER PUBLICATIONS

Freedom Scientific, Inc., MAGic® Screen Magnification Software Flyer, retrieved from http://www.freedomscientific.com/products/low-vision/MAGic-screen-magnification-software.asp, on Aug. 19, 2013, 2 pages.

* cited by examiner

ACQUIRING REGIONS OF REMOTE SHARED CONTENT WITH HIGH RESOLUTION

TECHNICAL FIELD

The present disclosure relates to shared content in on-line conference sessions.

BACKGROUND

High resolution computer displays are now common. In on-line/web-based meetings in which a party with a high resolution display shares desktop content with another participant having a lower resolution display (e.g., a small mobile phone, laptop, small terminal monitor), current on-line meeting systems typically fit the shared content to a window within the other participant's display by reducing the image resolution. As a result, the other participant may not be able to discern relevant details, and often must request that the sharing party zoom in on the shared content or increase its font size. In addition, if the other participant wishes to capture a screenshot of the shared content, the resolution of the screenshot is limited to the resolution of the image shown on that participant's display.

DESCRIPTION OF EXAMPLE EMBODIMENTS

Overview

Presented herein are techniques to enable a meeting participant/attendee at a first endpoint device in an online/web-based meeting/conference to acquire shared content with higher resolution. The first endpoint device receives an initial image of content shared by a second endpoint in the online/web-based meeting/conference. At the first endpoint, the initial image of the shared content is displayed. A user selection of a selected region of the initial image is received at the first endpoint, and a second image of the shared content corresponding to the selected region is received at the first endpoint, wherein the second image has a higher resolution than the initial image.

Example Embodiments

Figure 1:
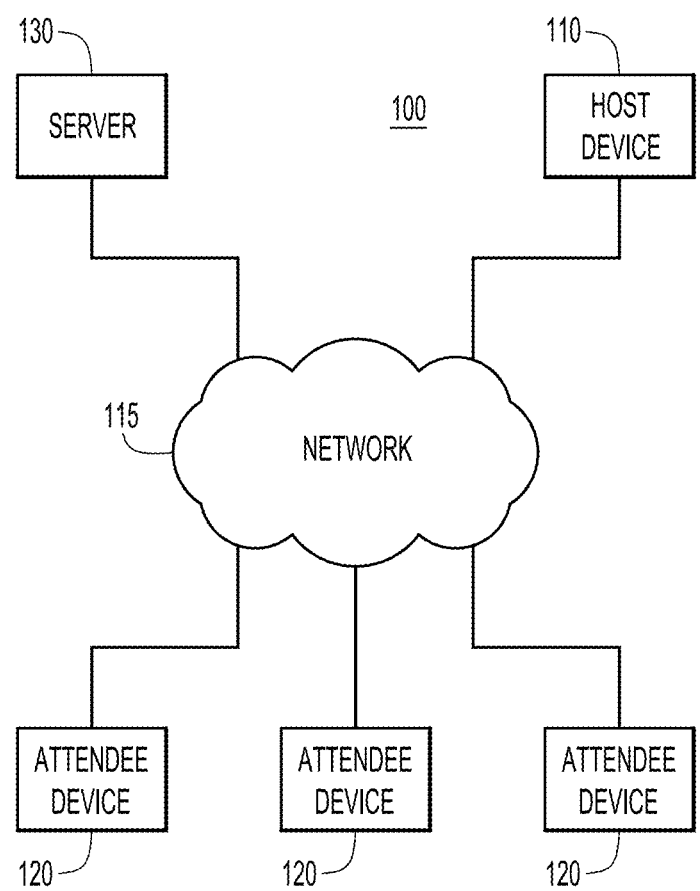
FIG. 1 is a block diagram of an example system in which computing devices are connected to facilitate a conference session between the devices, including desktop sharing from one device to one or more other devices.

FIG. 1 depicts a block diagram of an example system 100 that facilitates conference sessions between two or more computing devices, where a conference session may include sharing of desktop content displayed by one computing device with other computing devices of the system. A conference session can be any suitable communication session (e.g., instant messaging, video conferencing, web or other on-line conferencing/meeting, remote log-in and control of one computing device by another computing device, etc.) in which audio, video, document, screen image and/or any other type of content is shared between two or more computing devices. Shared content may include a desktop sharing, in which a computing device shares its desktop content (e.g., open documents, video content, images and/or any other content that is currently displayed by the computing device sharing the content) with other computing devices in a real-time collaboration session. In other words, desktop sharing during a collaboration session allows other computing devices to receive and display the content that is being displayed at the computing device sharing such content.

System 100 includes a plurality of endpoint devices, including a host device 110 and one or more attendee devices 120. The endpoint devices may communicate with each other and/or one or more servers 130 over network 115. A single server 130 is shown for simplicity. The endpoint devices may take a variety of forms, including a desktop computer, laptop computer, mobile/cellular phone, tablet computer, etc. Network 115 may include one or more wired and/or wireless local and/or wide area networks. Host device 110 is an endpoint device from which content (e.g., a desktop, application, document, etc.) is being shared with meeting attendees at attendee devices 120.

While the embodiment of FIG. 1 is described in the context of a client/server system where the server 130 is used to receive content from the host device 110 for redistribution to one or more attendee devices 120, it is noted that content sharing and acquisition of shared content with high resolution utilizing the techniques described herein are not limited to client/server systems but instead are applicable to any content sharing that can occur between two computing devices (e.g., content sharing directly between two computing devices).

Figure 2:
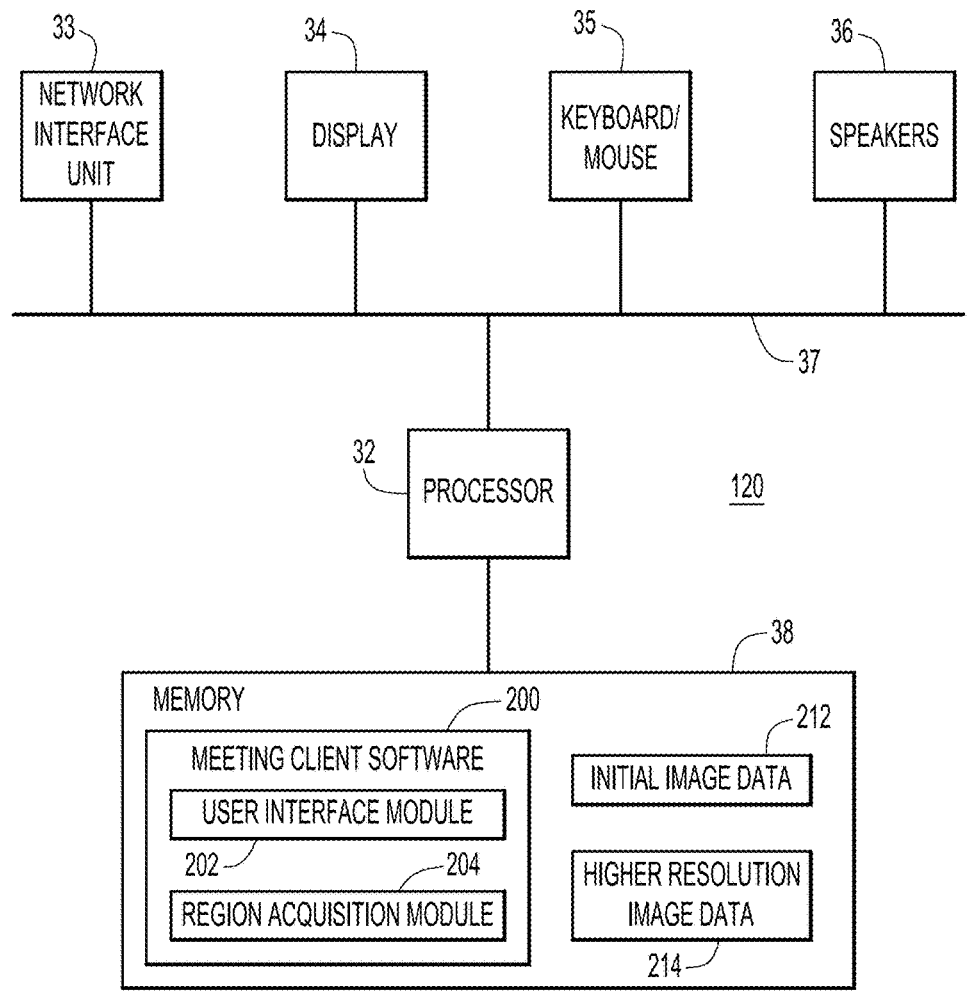
FIG. 2 is a block diagram of an example computing device configured to operate as an attendee device in the system of FIG. 1.

FIG. 2 shows a block diagram of an example attendee device 120. The attendee device includes a processor 32, network interface unit 33, display unit 34, keyboard/mouse 35, and audio speakers 36, each connected to a bus 37. Network interface unit 33 is a network interface card (NIC), for example, that enables network communications on behalf of the attendee device. Attendee device 120 includes a memory 38 that stores or is encoded with software for execution by processor 32 and stores data received and generated in the course of operation of the attendee device. Memory 38 may comprise read only memory (ROM), random access memory (RAM), magnetic disk storage media devices, optical storage media devices, flash memory devices, electrical, optical, or other physical/tangible memory storage devices. The processor 32 is, for example, a microprocessor or microcontroller that executes instructions for acquiring shared content in an online conference. Thus, in general, memory 38 may comprise one or more tangible (non-transitory) computer readable storage media (e.g., a memory device) encoded with software comprising computer executable instructions, and when the software is executed (by processor 32) it is operable to perform the operations described herein for attendee device 120.

In particular, memory 38 of attendee device 120 stores meeting client software 200, initial image data 212, and higher resolution image data 214, as depicted in FIG. 2. Meeting client software 200 includes a user interface module 202 and a region acquisition module 204. Meeting client software 200 enables the attendee device 120 to participate in an online meeting/conference in which a host device shares content (e.g., a desktop, application, document, etc.). User interface module 202 handles the presentation of the shared content at the attendee device 120, including graphical user interface elements, visual display of the shared content on display 34, and optionally output of audio on speakers 36. Initial image data 212 corresponds to an image of the shared content with an initial resolution. Higher resolution image data 214 corresponds to an image of some or all of the shared content with improved resolution compared to the initial resolution, as will become apparent from the following description. Region acquisition module 204 is responsible for handling operations at the attendee device 120 described below to acquire higher resolution data covering a selected region of the shared content (e.g., determining local coordinates of a selected region, calculating relative coordinates, sending notifications and requests, receiving and processing high resolution image data, etc.).

Figure 3:
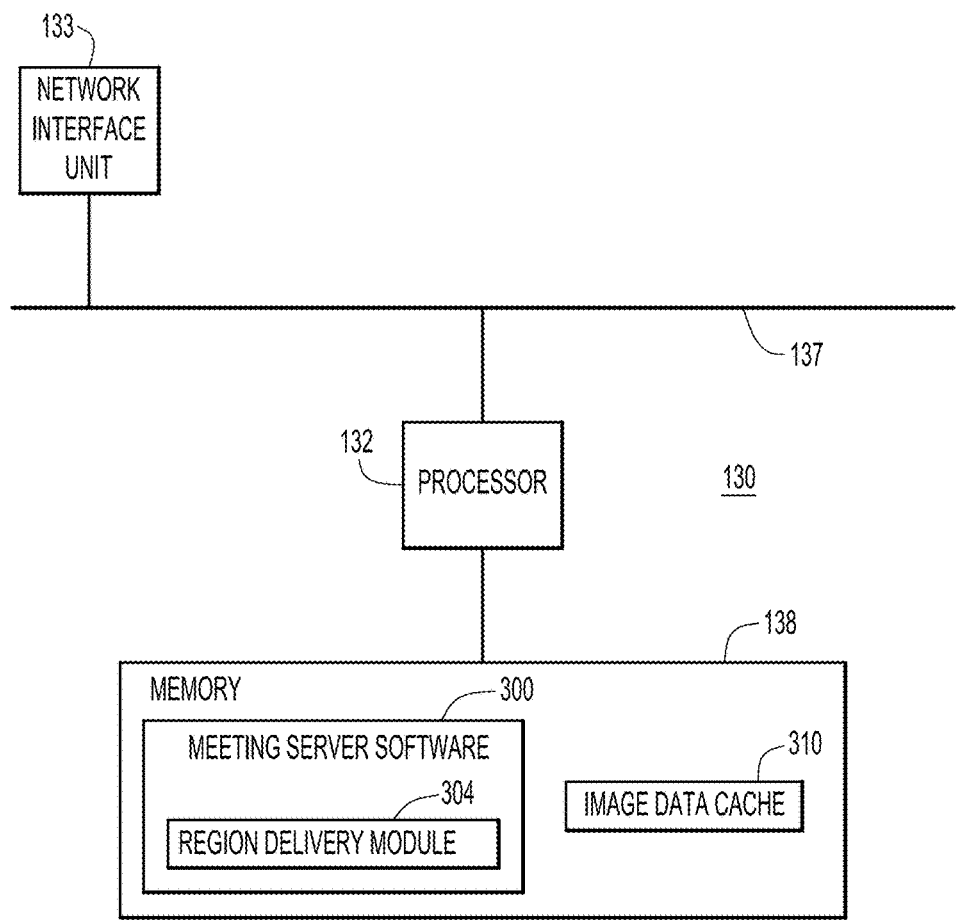
FIG. 3 is a block diagram of an example computing device configured to operate as a server in the system of FIG. 1.

FIG. 3 shows a block diagram of an example server 130 that may participate in the techniques presented herein. Server 130 may be implemented by a computer system in a similar manner as an endpoint device. For example, server 130 includes a processor 132 and network interface unit 133, each connected to a bus 137. Server 130 also includes a memory 138 that stores or is encoded with software for execution by processor 132 and stores data received and generated in the course of operation of the server as described herein. In particular, memory 138 of server 130 stores meeting server software 300 and includes image data cache 310. Meeting server software 300 enables the server 130 to deliver shared content from the host to attendee endpoints in an online conference/meeting. The meeting server software 300 includes a region delivery module 304 to process requests from an attendee device for improved resolution image data corresponding to a region of the shared content.

Host device 110 may be implemented in a similar manner to attendee device 120, and, in some embodiments, may further include meeting server software 300 and/or region delivery module 304 residing within memory for execution by a processor of the host device. This variation is particularly useful to support a peer-to-peer communication session.

Figure 4:
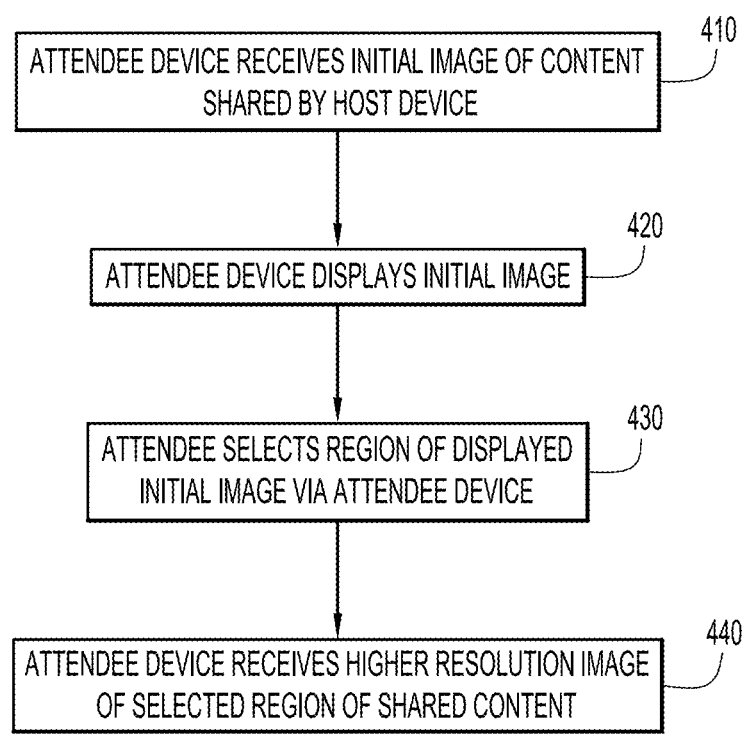
FIG. 4 is a flow chart of example operations performed by an attendee device to acquire regions of shared content with higher resolution in accordance with embodiments described herein.

Reference is now made to FIG. 4 as well as the subsequent figures that provide examples of outcomes of operations depicted in FIG. 4. FIG. 4 shows a flow chart of example operations performed by an attendee device to acquire regions of shared content with higher resolution. The operations shown in FIG. 4 may be performed when processor 32 executes the software instructions for region acquisition module 204 at an attendee device that is participating in an online meeting in which content is being shared.

At step 410, an attendee device 120 receives initial image data 212 (FIG. 2) for an initial image corresponding to content shared by host device 110. For example, the host device may include a display and share a desktop shown on this display with the attendee devices. The image shown on the host display is referred to as the "real image." Data corresponding to the real image is referred to as "raw image data." Raw image data generally has little or no lossy compression. An attendee device may receive data corresponding to an image of the desktop having lower resolution (e.g., spatial resolution and/or color resolution) than the real image. For example, the image may be subject to a greater degree of lossy compression than the raw image data to reduce the impact on network traffic, to deliver the image faster, or because the attendee device has a smaller or lower resolution display.

Figure 5:
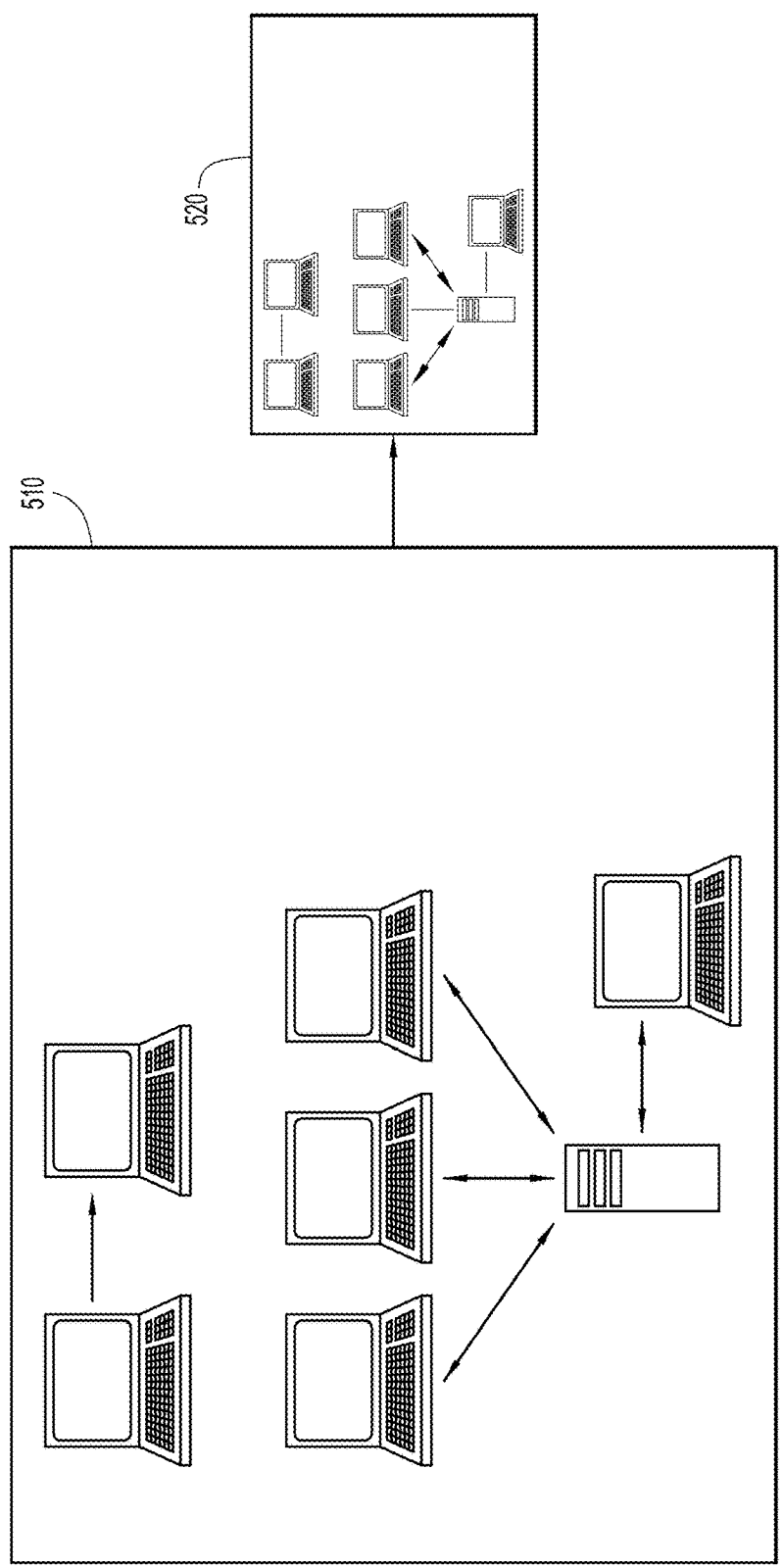
FIG. 5 depicts an example screenshot image of shared content on a host display and an image of the shared content rendered with lower resolution to fit within a smaller/lower resolution attendee device display.

At step 420, attendee device 120 displays the initial image of the shared content. The attendee device may display an initial image of a shared desktop having lower resolution than the real image in order to fit the shared content within a smaller or lower resolution display or window of the attendee device. FIG. 5 shows an example real image 510 displayed at a host device, and an initial image 520 fit to the display of an attendee device.

Returning to FIG. 4, at step 430, the attendee selects a region of the displayed initial image 520 at attendee device 120 (e.g., via user interface module 202), and at step 440, the attendee device receives an image of the selected region of shared content having higher resolution than the initial image (e.g., by way of operation of the region acquisition module 204). For example, one aspect of an embodiment enables the attendee to emulate magnification of a region of the initial image. The attendee device displays a graphical user interface element configured to simulate magnification of the selected region and receives image data corresponding to the resolution of the real image for an area including the selected region. The attendee device displays the magnified selected region with a resolution higher than the initial image (e.g., a resolution equal to that of the real image). In another form, the attendee is enabled to define or select a region of the initial image to capture for higher resolution; and in response, the attendee devices receives and locally stores an image of the selected region having higher resolution than the initial image.

Figure 6:
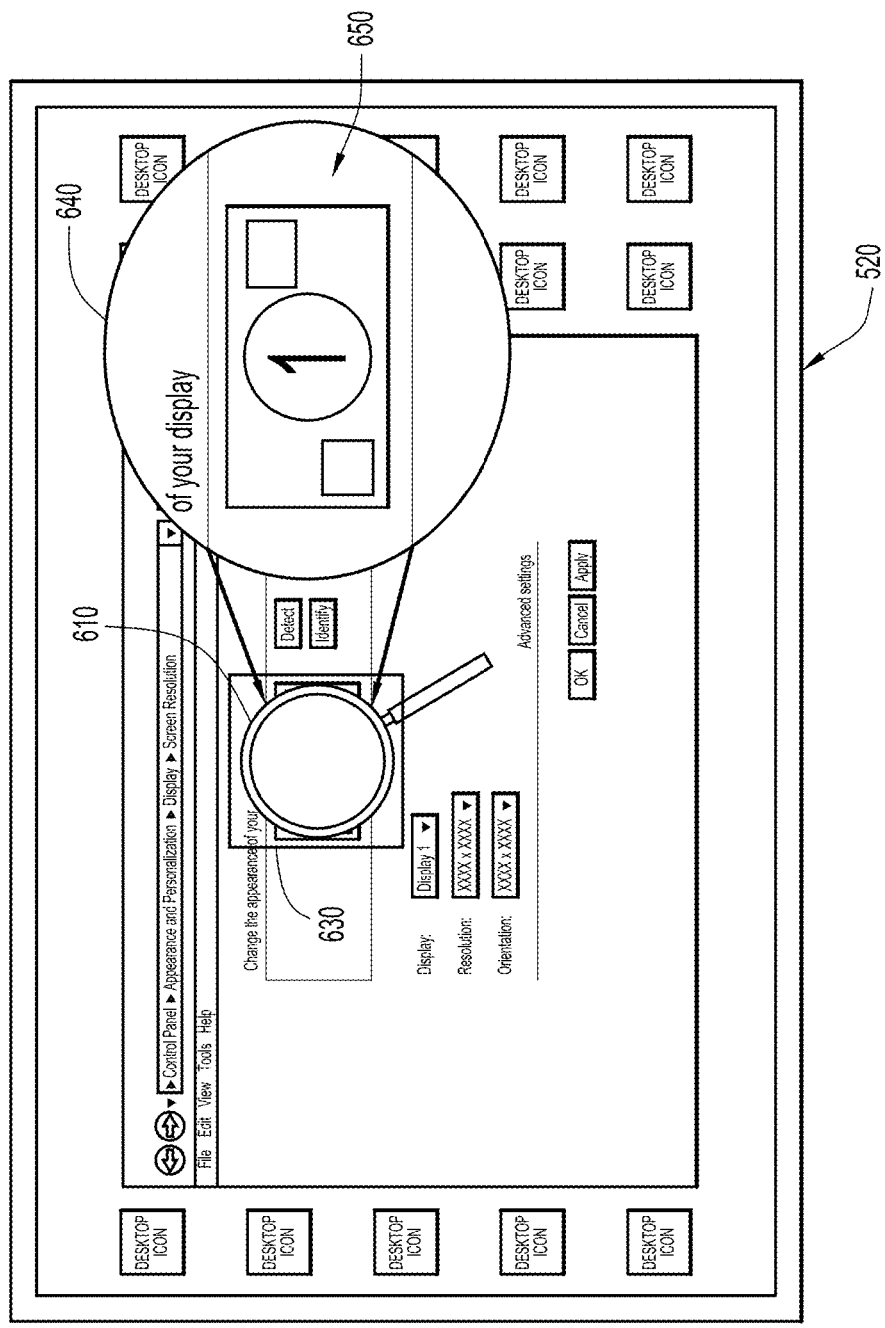
FIG. 6 depicts an example screenshot image of graphical user interface elements configured to simulate magnification of a selected region of shared content according to the techniques presented herein.

FIG. 6 depicts example graphical user interface elements configured to simulate magnification of a selected region of shared content according to the techniques presented herein. The scenario depicted in FIG. 6 is used in subsequent figures and consequently certain reference numerals from FIG. 6 are repeated in subsequent figures. The graphical user interface elements shown in FIG. 6 may be used by an attendee/user at step 430 (FIG. 4). Specifically, the graphical user interface elements may include a magnifier element 610. The attendee may position the magnifier element over any area of the initial image 520 (FIG. 5) of the shared content rendered on the attendee device display to select a region 630 to view more clearly or in greater detail. An improved resolution image 650 of the selected region may be displayed in viewing area 640. The improved resolution image has a resolution greater than that of the initial image (e.g., the resolution of the real image). The attendee may configure the magnification, the shape and size of the magnifier element 610, and consequently the shape and size of the viewing area. Alternatively, the magnification may be based on the ratio of the host device's resolution to attendee device's resolution. The magnifier operation may be used on a personal computer and on a small screen device (e.g., mobile device, tablet, etc.). In a mobile device with a touch screen interface, the magnifier operation may be triggered with a relatively long/sustained press of a user's finger(s) on the touch screen.

Figure 7:
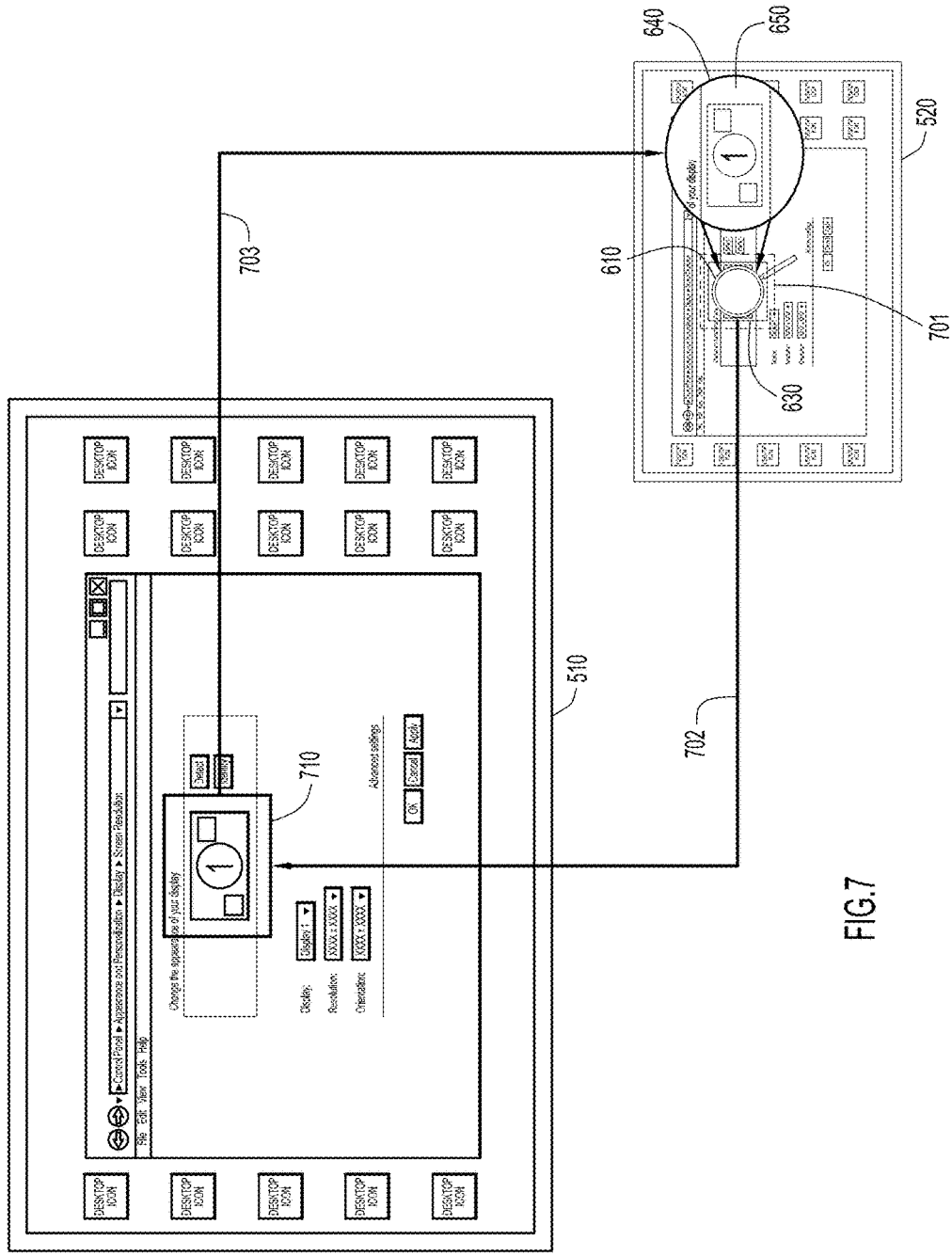
FIG. 7 depicts an example screenshot image showing a manner of acquiring an image of shared content corresponding to a region selected via a magnifier operation in which an attendee device acquires improved resolution image data for a part of the shared content corresponding to a selected region.

FIG. 7 depicts one manner of acquiring an image of shared content corresponding to a region selected via a magnifier operation. This approach is referred to as "part mode" and is based on acquiring improved resolution image data corresponding to part of the shared content. This approach is described initially, by way of example, with respect to an embodiment in which host device 110 includes a region delivery module 304 and communicates with attendee device 120 over the network directly or mediated via a server 130.

At 701, the attendee locates the magnifier element 610 over a region of the initial image of the shared content displayed on the attendee device to define the selected region 630. Region acquisition module 204 calculates the relative coordinates values of the selected region. For example, the selected region may be defined by four corners of a rectangle, where the relative coordinates of a corner are the distance from the top of the image and left edge of the image as a fraction of the image height and width, respectively.

At 702, the attendee device 120 sends the relative coordinate values to the host device 110 with a request for improved resolution image data. The region delivery module 304 receives the relative coordinate values and obtains data corresponding to a higher resolution image of the region defined by the relative coordinates. For example, the region delivery module 304 may obtain raw image data by capturing the real image of the region 710 of the host device display defined by the relative coordinates.

At 703, the region delivery module sends the improved image data (e.g., raw image data) corresponding to the selected region to the requesting attendee device. The attendee device receives the improved resolution image data and renders an improved resolution image 650 of the selected region in viewing area 640.

Figure 8:
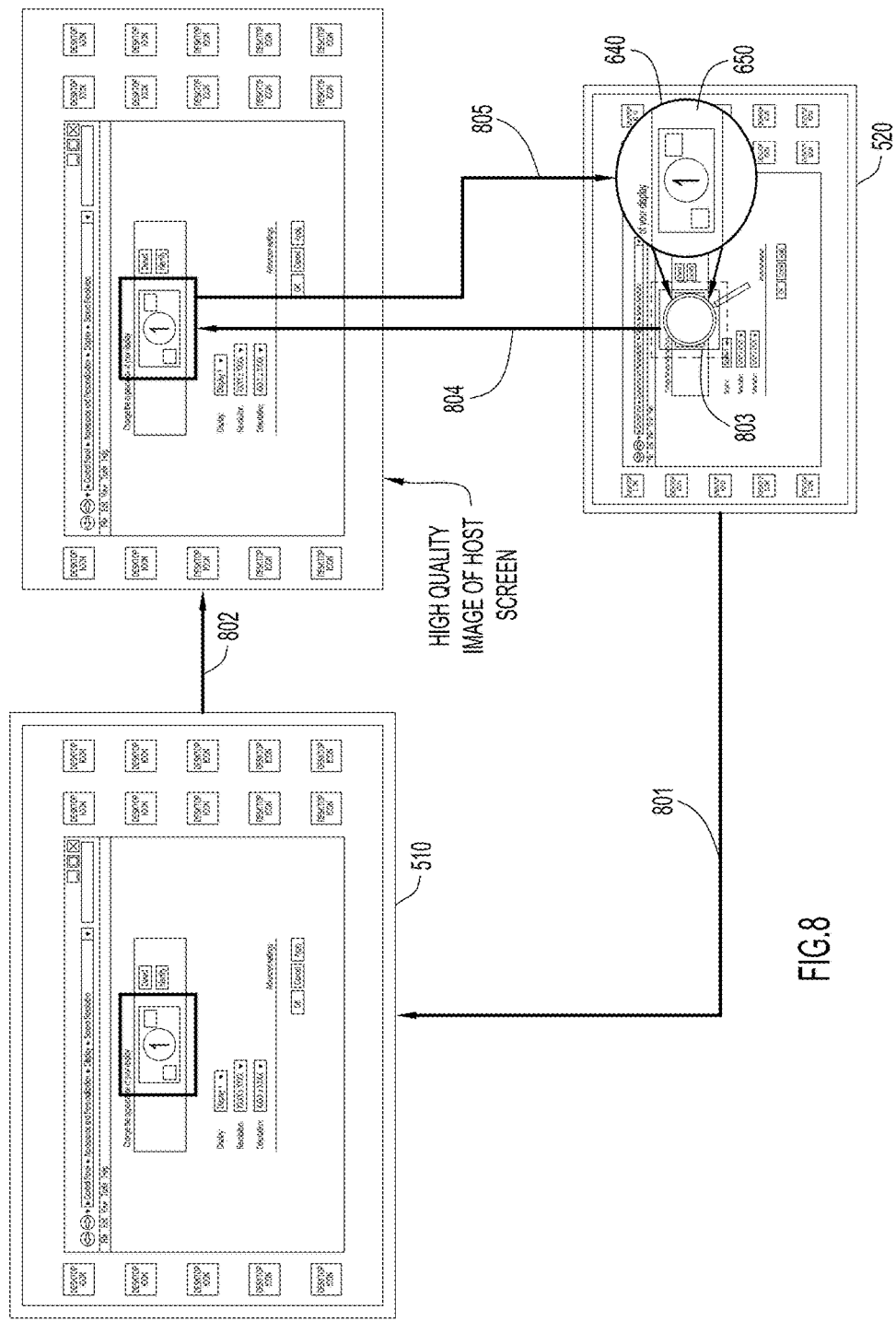
FIG. 8 depicts an example screenshot image showing a manner of acquiring an image of shared content corresponding to a region selected via a magnifier operation in which an attendee device acquires improved resolution image data for the whole or entirety of the shared content.

FIG. 8 depicts another manner of acquiring an image of shared content corresponding to a region selected via a magnifier operation. This approach is referred to as "whole mode" and is based on acquiring improved resolution image data corresponding to a whole or entire image of the shared content.

An attendee invokes the magnifier element and begins to position the magnifier element over the initial image. In response, at 801, the meeting client software sends a notification to the host device. The host device receives the notification and at 802 sends higher resolution image data 214 (FIG. 2) for the whole shared content to the attendee device. The attendee receives the data and caches it in memory. While the attendee is using the magnifier element, the host device sends changes to the higher resolution image of the shared content to the attendee device in real time. At 803, the region acquisition module determines the selected region at the attendee device and calculates the relative coordinate values of the selected region. At 804, the region acquisition module uses the relative coordinate values to retrieve data corresponding to the selected region from the cached higher resolution image data. At 805, this data is used to render an improved resolution image 650 of the selected region in the viewing area 640.

Figure 9:
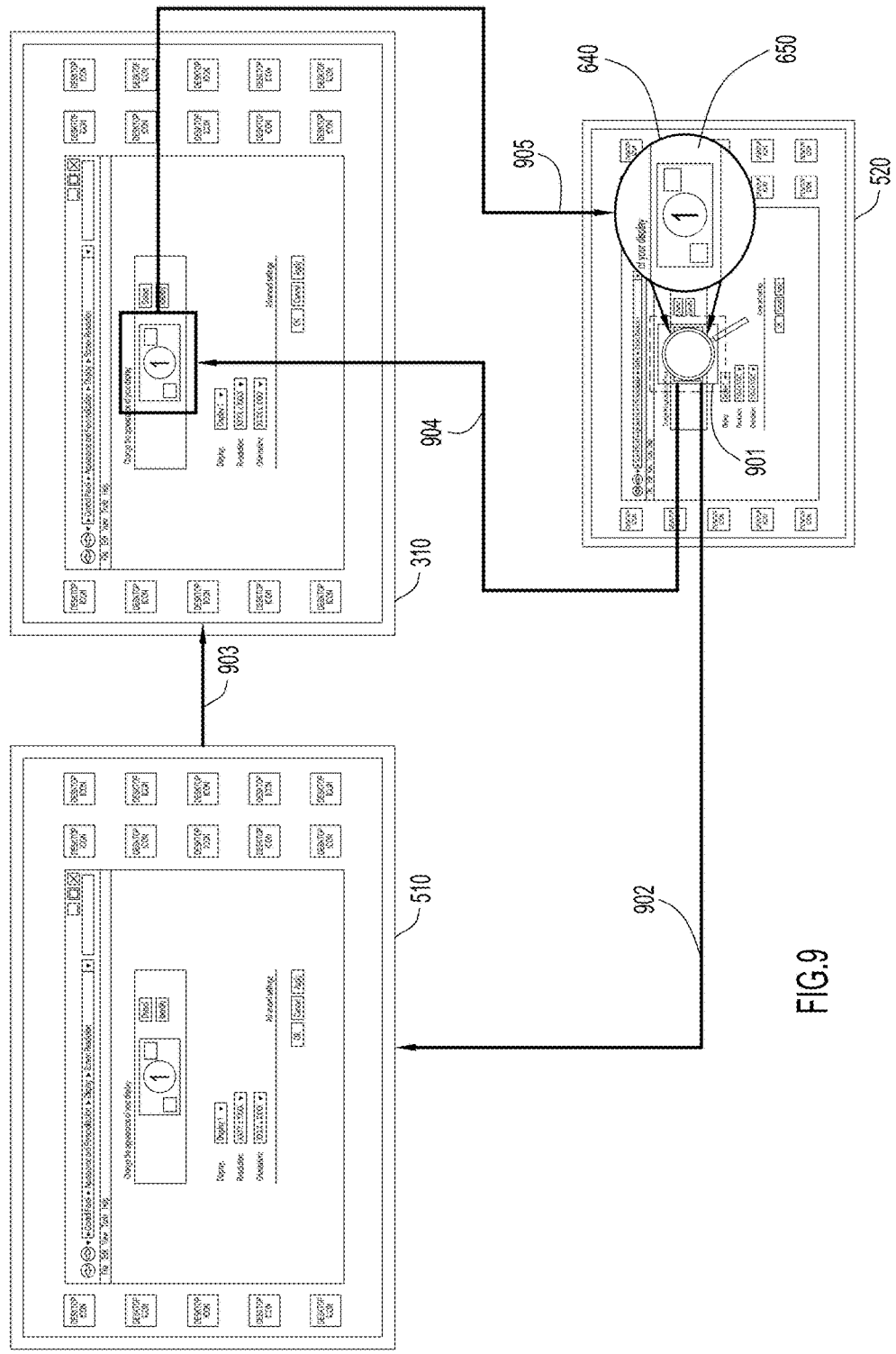
FIG. 9 depicts an example screenshot image showing a manner of acquiring an image of shared content corresponding to a region selected via a magnifier operation in which an attendee device acquires improved resolution image data via a server.

FIG. 9 depicts yet another manner of acquiring an image of shared content corresponding to a region selected via a magnifier operation. This approach is referred to as "server mode" and includes the use of server 130 to receive image data from a host device and distribute image data to one or more attendee devices. At 901, the attendee device determines the location of the selected region in its display and calculates relative coordinate values for this region. At 902, the attendee device sends a notification to the host device that an attendee has started the magnifier operation. At 903, the host device receives the notification. In response, the host device sends raw image data corresponding to the whole screen to the server. The server receives the raw image data and caches the raw image data in memory, e.g., in image data cache 310 (FIG. 3). Subsequently, the host device sends the server 130 updates to the raw data corresponding to changes to the shared content; this may help to reduce data traffic between the host and server. At 904, the attendee device sends the relative coordinate values to the server. The server 130 receives the relative coordinate values and reads raw data for the region defined by the relative coordinates from the image data cache. At 905, the server sends the raw data for the region to the attendee device. The attendee device receives the raw data and renders an improved resolution image 650 in the viewing area 640 based on the received raw data.

Thus, in server mode, the host device sends one copy of the raw image data to the server. Attendee devices using the magnifier operation receive raw data from server rather than the directly from the host. This reduces the load on the host device and places the load on a server, which may have greater processing power and input/output rate.

Part mode and whole mode represent complementary approaches to acquiring improved resolution image data at an attendee device. Part mode typically transfers less data than would be transferred in the whole mode, but may incur a lag in response when an attendee moves the magnifier element to select a new region, whereas, in whole mode, the response to movement of the magnifier element is faster once the attendee device has cached data for the whole improved resolution image. Either or both approaches may be used in conjunction with server mode. In one form, both whole mode and part mode may be implemented, and a user may choose which mode to use. In another form, the meeting client or server may dynamically combine use of each mode to improve the user experience based on the system configuration and/or performance.

Figure 10:
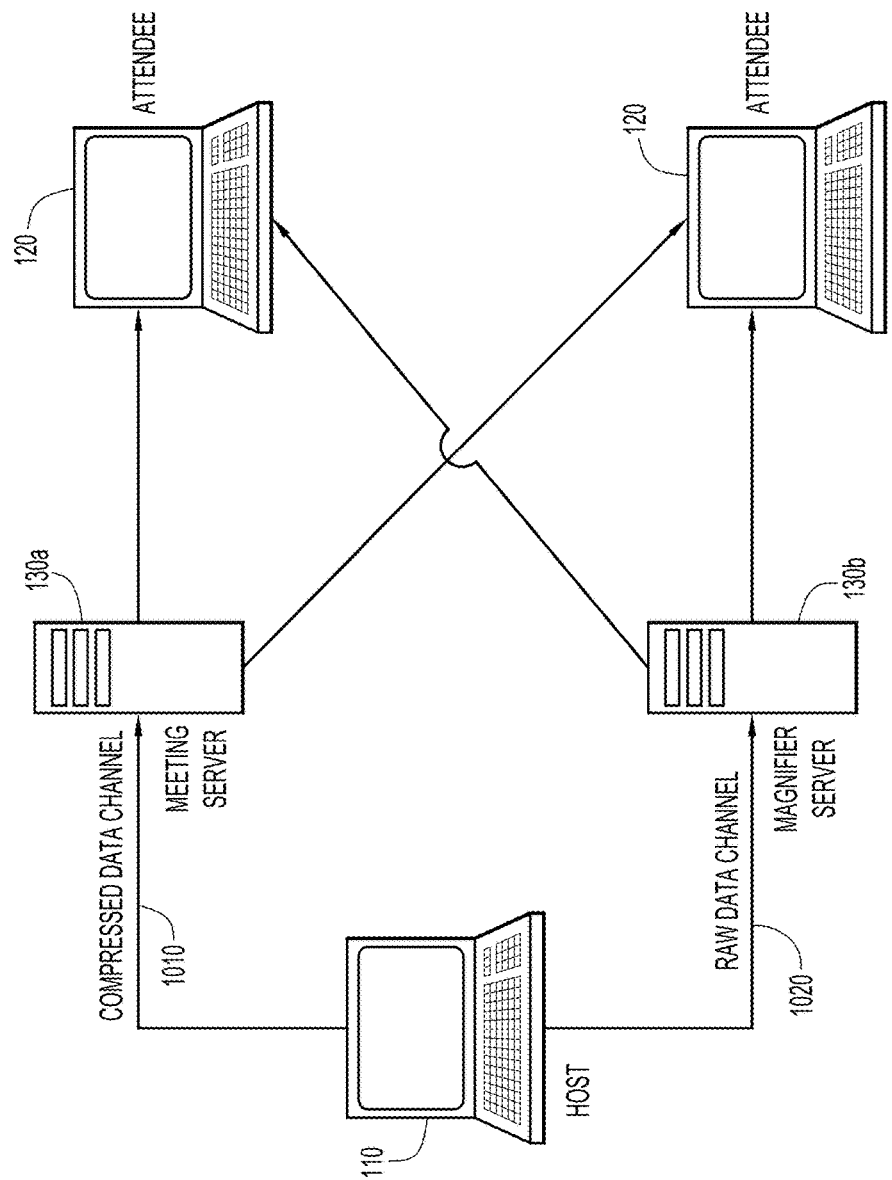
FIG. 10 is a block diagram of a system in which attendee devices receive initial image data from a first server and higher resolution data from a second server.

The system may include any number of servers 130 implementing any combination of operations. For example, FIG. 10 depicts an embodiment with two servers supporting two data channels. Compressed data channel 1010 is used to transfer initial, reduced resolution image data for the shared content from the host device 110 to attendee devices 120 via server 130*a*, while raw data channel 1020 is used to transfer raw image data for the shared content from the host device to attendee devices via server 130*b* for use with the magnifier operation. This may improve the speed with which an attendee device receives initial and higher resolution image data, and thereby improve the responsiveness of the magnifier operation for the user.

Another technique to improve the responsiveness of the magnifier operation for the user in a system with slow network performance is data transitioning. According to this technique, the attendee device may first render an image of the selected region in the viewing area based on the initial image data. The attendee device may re-render the viewing area upon receiving higher resolution image data.

According to still another embodiment, an attendee is enabled to select a region of an initial image of shared content displayed on the attendee device and capture an improved resolution image of the region. Conventional screen capture tools capture the local screen and are limited to the local display's resolution. As a result, the captured image may appear fuzzy, particularly if viewed under zoom or magnification. In contrast, the techniques presented herein enable an attendee to capture an image with higher resolution than the initial image by acquiring raw image data.

Figure 11:
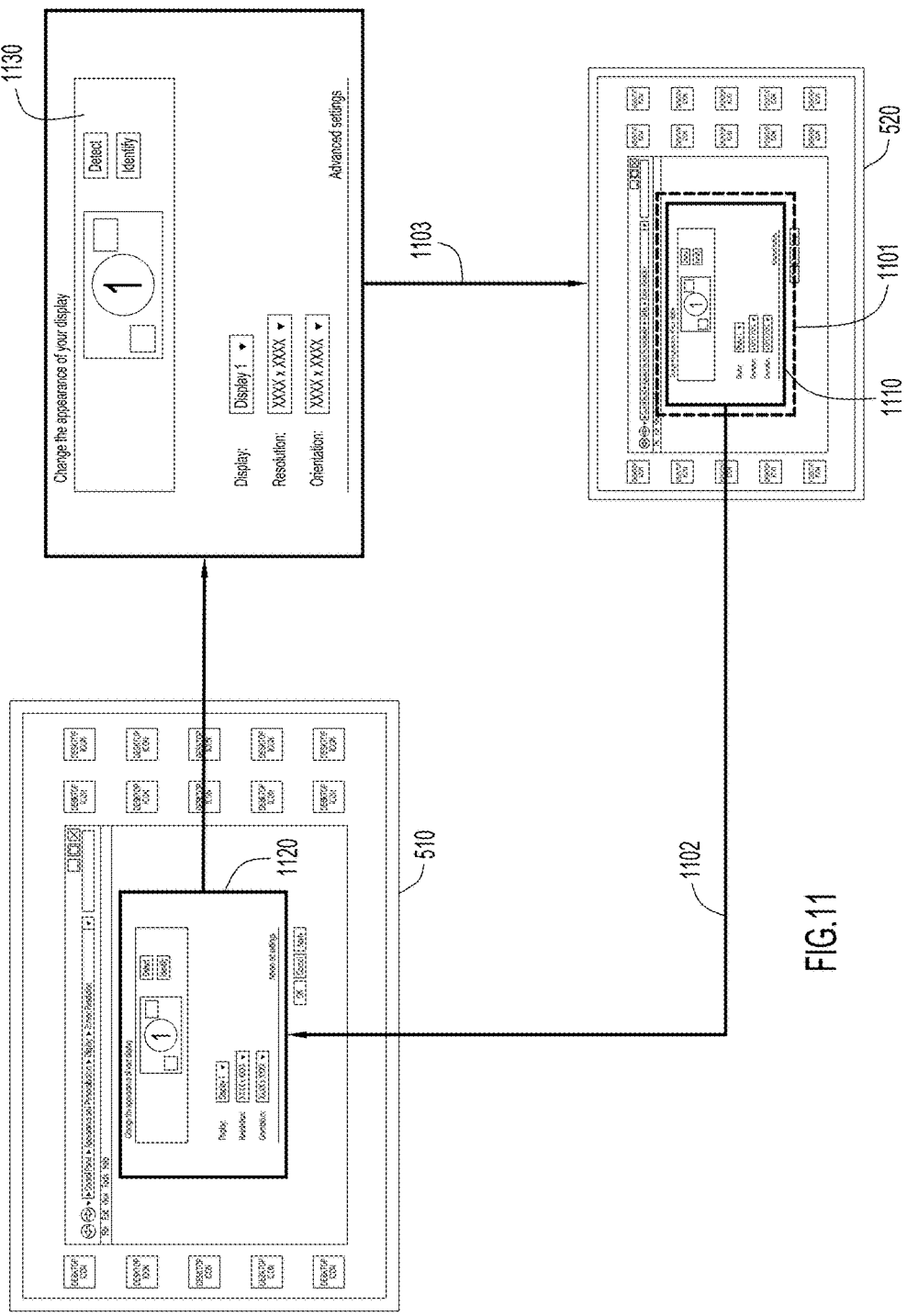
FIG. 11 depicts an example screenshot image showing a selection of a region of shared content for image capture according to the techniques presented herein.
Figure 12:
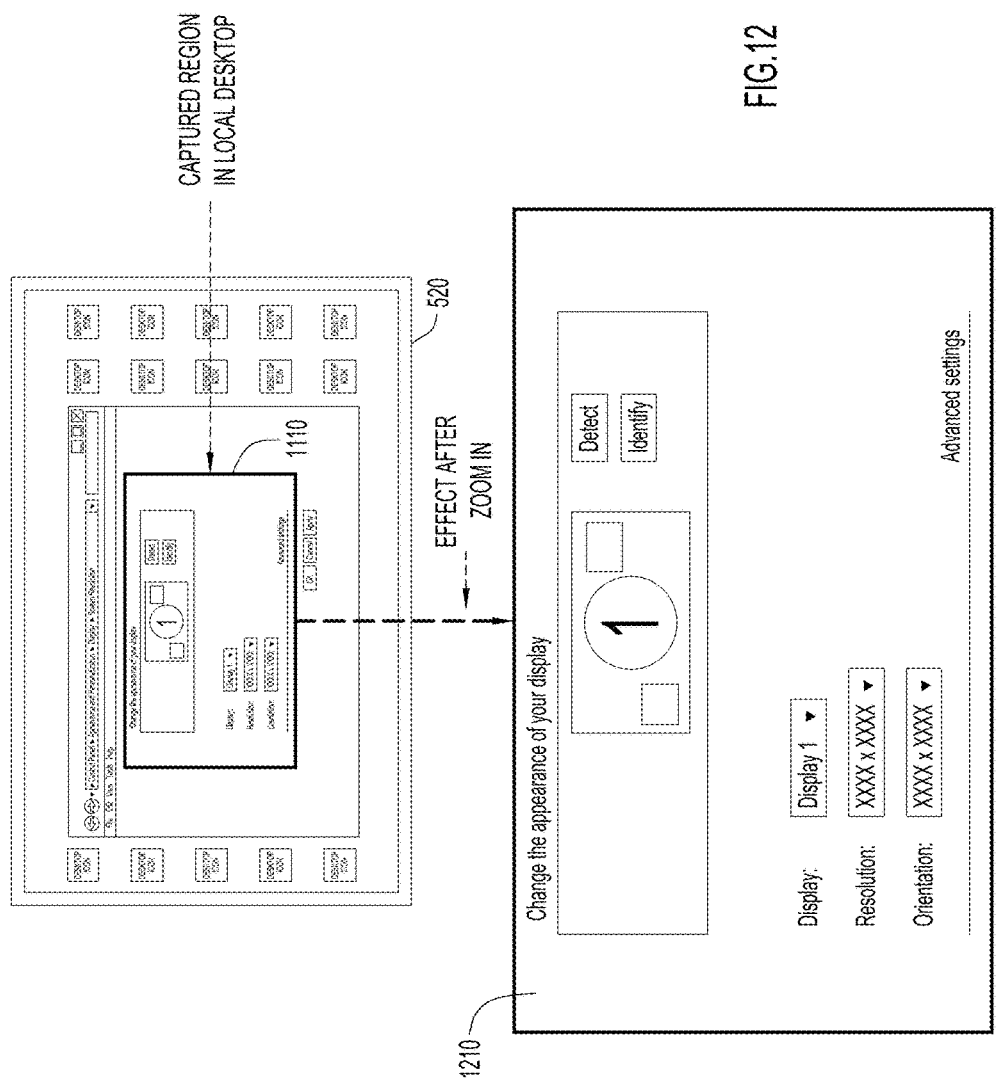
FIG. 12 depicts an example screenshot image of content captured from a remote display.

An example scenario for capturing a region of a remote image according to the techniques presented herein is illustrated in FIGS. 11 and 12. At 1101, an attendee begins a "capture remote screen" operation (e.g., via selecting an operation via user interface module 202). The attendee selects (e.g., using a mouse, stylus, gesture, etc.) a region 1110 of the initial image to be captured. The region acquisition module 204 determines relative coordinates of the selected region. At 1102, the region acquisition module sends the relative coordinate values to the region delivery module (executing within, e.g., server 130 or host 110). The region delivery module receives the relative coordinate values and retrieves raw image data for the region, shown at 1120, defined by the relatively coordinate values. For example, the host may capture screen data for the image 1130 within the region 1120 defined by the relative coordinates, or the server may retrieve corresponding raw image data from its image data cache. At 1103, the region delivery module sends the raw image data to the attendee device. The region acquisition module receives the raw image data and saves the data as a captured screen image. Thus a captured image 1210 may show greater detail or clarity than the initial image, particularly if viewed under zoom or magnification, as illustrated in FIG. 12. Alternatively, the region acquisition module may capture an image based on the initial image data under particular circumstances (e.g., if the network is slow or unstable and the user has configured the region acquisition module to do so), although the resulting captured image may have reduce resolution.

In summary, as depicted in FIGS. 11 and 12, a user is enabled to capture an image of the remote screen, which may have higher resolution than the local screen. The initial image displayed on the local screen may be based on data subject to lossy compression, while the captured image is not compressed or compressed with less loss of information.

If the display of the host device and the display of the attendee device have different aspect ratios, the meeting client software may fill an unused portion of the attendee device display with a mask color. When an attendee selects a region of the local display (e.g., to magnify or capture), the selected region may include a section of the screen filled with the mask color in addition to the initial image of the shared content.

Figure 13:
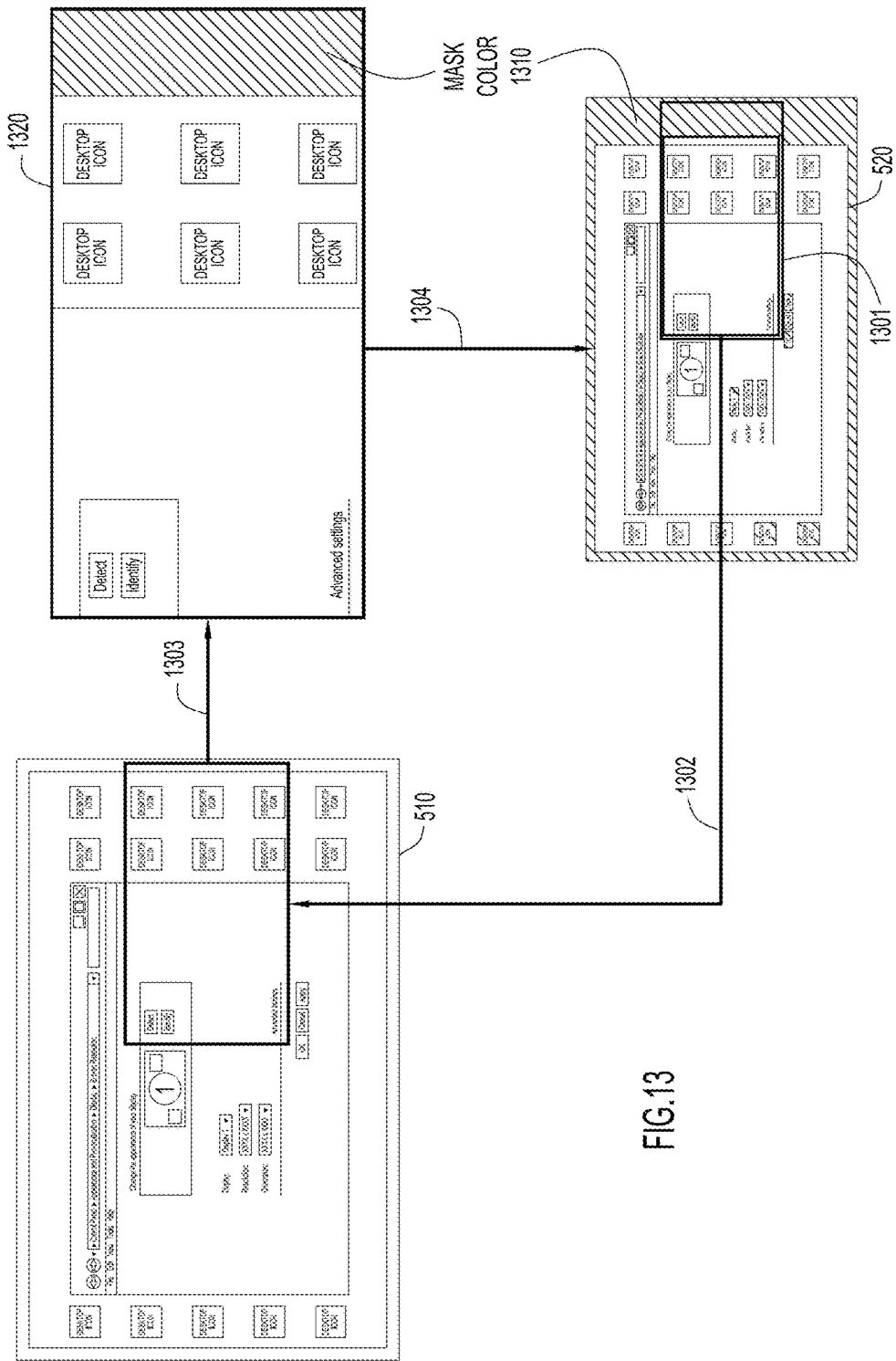
FIG. 13 depicts an example screenshot image showing an example manner of acquiring higher resolution content for a region including a mask color.

FIG. 13 illustrates an example scenario for acquiring higher resolution image data and use of a mask. At 1301, an attendee begins an operation to acquire higher resolution image data, e.g., to capture remote screen image data. The attendee selects a region that covers the initial image of the shared content 520 and mask color 1310. The region acquisition module determines relative coordinate values for the section of the region containing shared content and the section of the region containing mask color. At 1302, the meeting client software sends the relative coordinate values of the section containing shared content to the region delivery module (which may reside in a server or host device). The region delivery module retrieves improved resolution image data for the region defined by the relative coordinates (e.g., captures an image from the host device screen or reads raw image data from the image data cache). At 1303, the region delivery module sends the improved resolution image data to the attendee device. The region acquisition module receives the data, and creates a new logical image 1320 using the received data and mask color in proportion to the sections of shared content and mask color determined at 1301. At 1304, the region acquisition module saves the new logical image as a captured screen image.

In summary, the techniques presented herein enable acquiring regions of remote shared content with high resolution. For example, a meeting attendee may acquire an image of a shared desktop without lossy compression or compressed with less loss of information. Two aspects of an embodiment include a magnifier operation and a remote screen capture operation. The magnifier operation may be used, e.g., to view fine spatial detail and color of the shared content. The remote screen capture operation enables an attendee to save a clear image of shared content.

In method form, a method is provided comprising: at a first endpoint participating in an online conference, receiving an initial image of content shared by a second endpoint in the online conference; at the first endpoint, displaying the initial image of the shared content; receiving a user selection of a selected region of the initial image at the first endpoint; and at the first endpoint, receiving a second image of the shared content corresponding to the selected region, wherein the second image has a higher resolution than the initial image.

Further, one or more computer readable storage media are provided that are encoded with software comprising computer executable instructions and when the software is executed operable to: at a first endpoint participating in an online conference, receive an initial image of content shared by a second endpoint in the online conference; at the first endpoint, display the initial image of the shared content; receive a user selection of a selected region of the initial image at the first endpoint; and at the first endpoint, receive a second image of the shared content corresponding to the selected region, wherein the second image has a higher resolution than the initial image.

Moreover, an apparatus is provided comprising: a network interface unit configured to enable communications for a first endpoint participating in an online conference over a network; and a processor coupled to the network interface unit, wherein the processor is configured to: receive an initial image of content shared by a second endpoint in the online conference; display the initial image of the shared content; receive a user selection of a selected region of the initial image at the first endpoint; and receive a second image of the shared content corresponding to the selected region, wherein the second image has a higher resolution than the initial image.

The above description is intended by way of example only.

What is claimed is:

1. A method comprising:
   at a first endpoint participating in an online conference, receiving an initial image of content shared by a second endpoint in the online conference;
   at the first endpoint, displaying the initial image of the shared content at a lower resolution than the shared content is displayed at the second endpoint;
   receiving a user selection of a selected region of the initial image at the first endpoint;
   requesting higher resolution data of the selected region;
   at the first endpoint, receiving a second image of the shared content corresponding to the higher resolution data of the selected region, wherein the second image is generated in response to the first endpoint requesting the higher resolution data; and
   at the first endpoint, displaying the second image of the shared content with the higher resolution data.

2. The method of claim 1, wherein receiving the user selection comprises displaying a graphical user interface element configured to simulate magnification of the selected region, and further comprising displaying the magnified selected region with a resolution based on the second image.

3. The method of claim 2, further comprising:
   at the first endpoint, receiving changes to the second image corresponding to changes to the shared content at the second endpoint; and
   updating the display of the magnified selected region based on the received changes to the second image.

4. The method of claim 2, wherein the initial image and the second image are received via separate network channels.

5. The method of claim 1, wherein receiving the user selection comprises displaying a graphical interface user area element for selecting an area of the initial image, and receiving the second image of the shared content corresponding to the selected region comprises storing a persistent copy of the second image at the first endpoint.

6. The method of claim 1, wherein the initial image is produced by lossy compression, and wherein receiving the user selection comprises:
   determining relative coordinates of the selected region with respect to the first image;
   sending the relative coordinates from the first endpoint to a meeting server; and
   wherein receiving the second image comprises receiving the second image from the meeting server.

7. The method of claim 1, wherein receiving the second image of the shared content comprises receiving image data for a region larger than the selected region.

8. One or more non-transitory computer readable storage media encoded with software comprising computer executable instructions and when the software is executed operable to:
   at a first endpoint participating in an online conference, receive an initial image of content shared by a second endpoint in the online conference;
   at the first endpoint, display the initial image of the shared content at a lower resolution than the shared content is displayed at the second endpoint;
   receive a user selection of a selected region of the initial image at the first endpoint;
   request higher resolution data of the selected region;
   at the first endpoint, receive a second image of the shared content corresponding to the higher resolution data of the selected region, wherein the second image is generated in response to the first endpoint requesting the higher resolution data; and
   at the first endpoint, display the second image of the shared content with the higher resolution data.

9. The computer readable storage media of claim 8, wherein the instructions operable to receive the user selection comprise instructions operable to display a graphical user interface element configured to simulate magnification of the selected region, and further comprising instructions operable to display the magnified selected region with a resolution based on the second image.

10. The computer readable storage media of claim 9, further comprising instructions operable to:
    at the first endpoint, receive changes to the second image corresponding to changes to the shared content at the second endpoint; and
    update the display of the magnified selected region based on the received changes to the second image.

11. The computer readable storage media of claim 9, wherein the initial image and the second image are received via separate network channels.

12. The computer readable storage media of claim 8, wherein the instructions operable to receive the user selection comprise instructions operable to display a graphical interface user area element to enabler a user to select an area of the initial image, and the instructions operable to receive the second image of the shared content corresponding to the selected region comprises instructions operable to store a persistent copy of the second image at the first endpoint.

13. The computer readable storage media of claim 8, wherein the initial image is produced by lossy compression, and wherein the instructions operable to receive the user selection comprise instructions operable to:
    determine relative coordinates of the selected region with respect to the first image;
    send the relative coordinates from the first endpoint to a meeting server; and
    wherein the instructions operable to receive the second image comprise instructions operable to receive the second image from the meeting server.

14. The computer readable storage media of claim 8, wherein the instructions operable to receive the second image of the shared content comprises instructions operable to receive image data for a region larger than the selected region.

15. An apparatus comprising:
    a network interface unit configured to enable communications for a first endpoint participating in an online conference over a network; and
    a processor coupled to the network interface unit, wherein the processor is configured to:
    receive an initial image of content shared by a second endpoint in the online conference;
    display the initial image of the shared content at a lower resolution than the shared content is displayed at the second endpoint;
    receive a user selection of a selected region of the initial image at the first endpoint;

request higher resolution data of the selected region;

receive a second image of the shared content corresponding to the higher resolution data of the selected region, wherein the second image is generated in response to the apparatus requesting the higher resolution data; and display the second image of the shared content with the higher resolution than the selected region of the initial image.

16. The apparatus of claim 15, wherein the processor is configured to receive the user selection by to displaying data for a graphical user interface element configured to simulate magnification of the selected region, and to display the magnified selected region with a resolution based on the second image.

17. The apparatus of claim 16, wherein the processor is configured to:

receive changes to the second image corresponding to changes to the shared content at the second endpoint; and update the display of the magnified selected region based on the received changes to the second image.

18. The apparatus of claim 16, wherein the processor is configured to receive the initial image and the second image via separate network channels, via the network interface unit.

19. The apparatus of claim 15, wherein the processor is configured to generate data to display a graphical interface user area element to enable a user to select an area of the initial image, and to receive the second image of the shared content corresponding to the selected region by storing a persistent copy of the second image at the first endpoint.

20. The apparatus of claim 16, wherein the initial image is produced by lossy compression, and wherein the processor is configured to receive the user selection by:

determining relative coordinates of the selected region with respect to the first image;

sending the relative coordinates from the first endpoint to a meeting server; and receiving the second image from the meeting server.

* * * * *